US008223738B2

(12) United States Patent
Gandham et al.

(10) Patent No.: US 8,223,738 B2
(45) Date of Patent: *Jul. 17, 2012

(54) HETEROGENEOUS MAC PROTOCOL FOR MULTIPLE BASE STATIONS IN WIRELESS NETWORKS

(75) Inventors: Shashidhar R. Gandham, Sunrise, FL (US); Amit Shukla, Plantation, FL (US); Hai Vu, Richardson, TX (US)

(73) Assignee: XG Technology, Inc., Sarasota, FL (US)

( * ) Notice: Subject to any disclaimer, the term of this patent is extended or adjusted under 35 U.S.C. 154(b) by 647 days.

This patent is subject to a terminal disclaimer.

(21) Appl. No.: 12/380,698

(22) Filed: Mar. 3, 2009

(65) Prior Publication Data
US 2009/0257414 A1    Oct. 15, 2009

Related U.S. Application Data

(60) Provisional application No. 61/123,875, filed on Apr. 11, 2008.

(51) Int. Cl.
*H04J 3/00* (2006.01)
*H04W 4/00* (2009.01)

(52) U.S. Cl. .......... 370/345; 370/338; 370/336
(58) Field of Classification Search .......... 370/338, 370/345
See application file for complete search history.

(56) References Cited

U.S. PATENT DOCUMENTS

| 5,936,949 | A  | * | 8/1999  | Pasternak et al. | 370/328 |
| 2003/0018794 | A1 | * | 1/2003  | Zhang et al. | 709/231 |
| 2004/0213191 | A1 | * | 10/2004 | Lee | 370/338 |
| 2004/0218620 | A1 | * | 11/2004 | Palm et al. | 370/445 |
| 2005/0220131 | A1 | * | 10/2005 | Ginzburg et al. | 370/432 |
| 2006/0187873 | A1 | * | 8/2006  | Friday et al. | 370/328 |
| 2008/0171550 | A1 | * | 7/2008  | Zhao | 455/445 |
| 2009/0067389 | A1 | * | 3/2009  | Lee et al. | 370/336 |

* cited by examiner

*Primary Examiner* — Kenny Lin
*Assistant Examiner* — Noel Beharry
(74) *Attorney, Agent, or Firm* — Dennis L. Cook, Esq.

(57) ABSTRACT

This disclosure describes a new Medium Access Control (MAC) protocol that combines contention-free and contention-based MAC protocols into a heterogeneous MAC protocol used for forwarding VoIP traffic in VoIP systems on wireless networks using multiple base stations which addresses the need to transport high bit-rate data to multiple users over wired and wireless means.

3 Claims, 1 Drawing Sheet

Base Station with Three-Sector Antenna

Base Station with Three-Sector Antenna

Figure 2. Hyper-frame structure

HETEROGENEOUS MAC PROTOCOL FOR MULTIPLE BASE STATIONS IN WIRELESS NETWORKS

CROSS-REFERENCE TO RELATED APPLICATION

The present application claims the benefit of previously filed Provisional Patent Application, Ser. No. 61/123,875.

FIELD OF THE INVENTION

This invention addresses the need to transport high bit-rate data and voice to multiple users over wired and wireless means. Specifically, this disclosure describes a new MAC protocol that combines contention-free and contention-based MAC protocols for use in VOIP systems with multiple base stations.

BACKGROUND OF THE INVENTION

The invention disclosed in this application uses any integer cycle or impulse type modulation and more particularly is designed to work with a method of modulation named Tri-State Integer Cycle Modulation (TICM) which has been previously disclosed in U.S. Pat. No. 7,003,047 issued Feb. 21, 2006 and is now known by its commercial designation, xMax. This new wireless physical layer technology developed by xG Technology Inc., referred to as xMAX, enables extremely low power omni-directional transmissions to be received in a wide area. Using xMAX, significant bandwidth can be made available for supporting various wireless applications. Voice Over IP (VOIP) based cellular services are now being developed using xMAX. In xMAX-based cellular networks both the base station and the handsets will be equipped with an xMAX transceiver. A mobile device (xMAX handset) in such a network will be free to move in an area covered by multiple xMAX base stations. Although this Heterogeneous MAC protocol for multiple base stations is disclosed in the preferred embodiment as being used in these types of integer cycle and pulse modulation systems it can be implemented on any broad band wireless technologies like WiMax, WiBro, WiFi, 3GPP and HSDPA, or any other type of wired or wireless voice or data systems.

A heterogeneous MAC protocol proposed to support VOIP traffic in xMAX wireless networks was described in the pending patent application by one of the inventors of this application, "Heterogeneous MAC Protocol For Forwarding VoIP Traffic On Wireless Networks", U.S. Ser. No. 12/069,057, the contents of which are included herein. In that application guaranteed timeslots are assigned to forward VOIP packets, temporary timeslots are assigned to forward data packets and contention based access is used to exchange control messages. That application described the MAC protocol in the context of a single base station providing metropolitan wide mobile VOIP service. Though the xMAX signal can propagate significant distances in comparison with other wireless physical layer technologies, a single base station might not be able to cover an entire area of interest. Thus, there is a need to deploy multiple base stations such that coverage areas of adjacent base stations overlap. If each of the base stations were to operate independently then multiple concurrent transmissions in adjacent cells might interfere with each other. Hence, there is a need to modify the MAC protocol to support multiple base stations.

BRIEF SUMMARY OF THE INVENTION

In the application referenced above guaranteed timeslots are assigned to forward VOIP packets, temporary timeslots are assigned to forward data packets and contention based access is used to exchange control messages. That application described the MAC protocol in the context of a single base station providing metropolitan wide mobile VOIP service. Though the xMAX signal can propagate significant distances in comparison with other wireless physical layer technologies, a single base station might not be able to cover an entire area of interest. Thus, there is a need to deploy multiple base stations such that coverage areas of adjacent base stations overlap. If each of the base stations were to operate independently then multiple concurrent transmissions in adjacent cells might interfere with each other. In VOIP-based cellular networks xMAX handsets (or mobile nodes) will be equipped with the complete VOIP stack. The xMAX base station will be connected to the Internet through an Ethernet port. The mobile nodes will communicate with the xMAX base station to reach a VOIP gateway. To enable communication between an xMAX handset and multiple xMAX base stations we need a MAC (Medium Access Control) protocol that is optimized for VOIP traffic as described in the previous application referenced above and that also facilitates mobility of the handsets from one base station to another as described in this application.

DESCRIPTION OF THE DRAWINGS

For a fuller understanding of the nature and objects of the invention, reference should be made to the accompanying drawings, in which.

DETAILED DESCRIPTION OF THE INVENTION

The new wireless physical layer technology developed by xG Technology Inc., referred to as xMAX, enables extremely low power omni-directional transmissions to be received in a wide area. Using xMAX, significant bandwidth can be made available for supporting various wireless applications. Voice Over IP (VOIP) based cellular services are now being developed using xMAX. In xMAX-based cellular networks both the base station and the handsets will be equipped with an xMAX transceiver. A mobile device (xMAX handset) in such a network will be free to move in an area covered by multiple xMAX base stations. Although this Heterogeneous MAC protocol for multiple base stations is disclosed in the preferred embodiment as being used in these types of integer cycle and pulse modulation systems it can be implemented on any broad band wireless technologies like WiMax, WiBro, WiFi, 3GPP and HSDPA, or any other type of wired or wireless voice or data systems.

Figure 1:
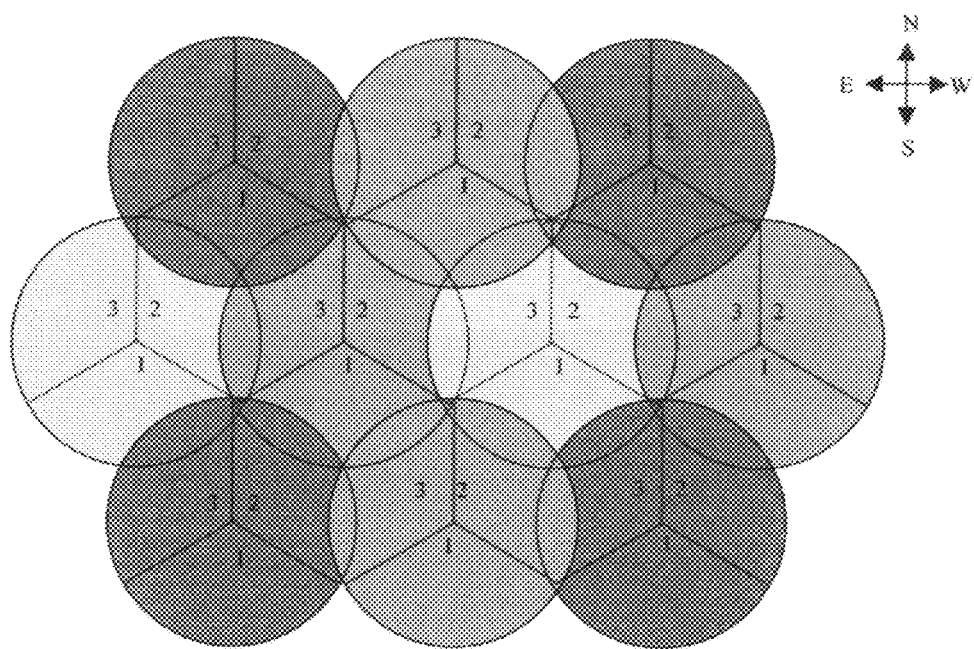
FIG. 1 is a representation of a xMax deployment scenario using multiple base stations with three-sector antennas.

In VOIP-based cellular networks xMAX handsets (or mobile nodes) will be equipped with the complete VOIP stack. The xMAX base station will be connected to the Internet through an Ethernet port. The mobile nodes will communicate with the xMAX base station to reach a VOIP gateway. FIG. 1 depicts the deployment scenario with multiple base stations. To enable communication between an xMAX handset and multiple xMAX base stations one needs a MAC (Medium Access Control) protocol that is optimized for VOIP traffic as described in the previous application referenced above and that also facilitates mobility of the handsets from one base station to another.

As shown in the preferred embodiment of FIG. 1 the reader should consider multiple base stations covering a geographical area. Adjacent base stations' coverage areas overlap in order to eliminate uncovered gaps in the coverage area and facilitate seamless mobility of the handsets from one base station to another. Each base station is equipped with a three-sectored antenna with each sector covering 120° in azimuth along with a feasible deployment scenario. The base station locations are carefully planned. In addition, the orientation of the sectors is pre-determined and remains fixed throughout the operational lifetime of the network. Notice that in FIG. 1 the sector orientation is symmetric; i.e., all the sectors with the same number are pointing in the same direction. For example, the first sector of each base station is facing south.

In the preferred embodiment all of the base stations are using the xMAX signal to communicate with handsets in their coverage area. In addition, the communication is carried over the ISM band near 900 MHz. Due to the inherent nature of a xMAX signal only one frequency channel is available in the system.

All the base station's clocks are synchronized. Numerous solutions exist for achieving clock synchronization that are well known to those skilled in the art. For example, Network Timing Protocol (NTP) version 3 described in RFC 1305 or Simple Network Timing Protocol (SNTP) described in RFC 2030 can be used. More information on both the protocols can be obtained from the www.ntp.org website. GPS is also an option to synchronize the base stations.

Figure 2:
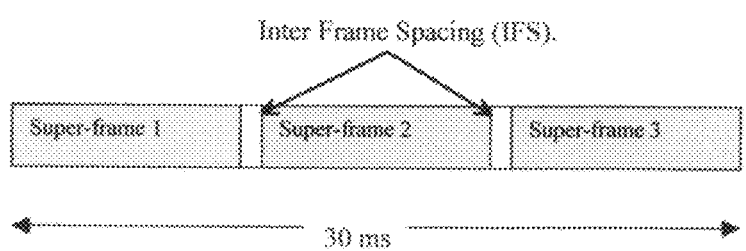
FIG. 2 is a representation of a Hyper-Frame format for the MAC protocol.

The basic idea for using xMAC in multi-base station deployment involves scheduling all the sectors with the same number concurrently. To accomplish such a schedule the time domain is sliced into equal intervals of time referred to as hyper-frames as shown in FIG. 2. Each hyper-frame is in turn split into multiple super-frames. Adjacent super-frames are separated by a time duration referred to as Inter Frame Spacing (IFS). Duration of the IFS depends on the amount of time it takes to switch between the corresponding sectors of the base stations.

The hyper-frame is a timeframe of 30 ms duration in which the super-frames of all interfering base stations are accommodated. For example, if there are three interfering base stations, then each will adjust their super-frame period to 10 ms to fit the hyper-frame. Note that the hyper-frame duration depends on the codec used and the value of the packetization interval set. For G.723.1 codec with a packetization interval of 30 milli-seconds we use a hyper-frame duration of 30 milli-seconds. If the packetization interval were to be increased to 60 milli-seconds then the hyper-frame duration can be set as 60 milli-seconds. The duration of the hyper-frame, duration of super-frames, and the number of super-frames in each hyper-frame is announced in each sector of the base station.

Each sector is numbered as shown in FIG. 1. Note that sectors that are assigned the same numeric value are pointing towards the same direction. For example, all sectors with value of one are pointing in a southern direction. The assignment of a numeric value can be done manually during the network planning phase or can be accomplished by a dynamic distributed algorithm. This value assignment algorithm is outside the scope of the current invention disclosure.

All sectors with an assigned value of one will operate in the first super-frame. Similarly, sectors with assigned value of two (resp. three) will operate in the second (resp. third) super-frame. In the proposed schedule, sectors 2 and 3 will not operate when sector 1 is operational. In addition, sectors 3 and 1 will not operate when sector 2 is operational. Similarly, sectors 1 and 2 will not operate when sector 3 is operating. Hence, interference of overlapping sectors with the same assigned values is eliminated.

Next, one needs to consider interference between sectors with the same assigned value that are neighbors. To mitigate this interference you have to ensure that the downlink and uplink duration of neighboring sectors with the same assigned value is the same. If this condition is not ensured it might be possible that an uplink transmission in one sector might interfere with a downlink transmission in a neighboring sector. The scenario would be more prevalent in handsets that are located on the boundary of the sectors and are associated with base station on different towers.

Note that one need not maintain a globally unique value of the downlink and uplink across all the sectors. Though such an implementation would be easier to develop it is not essentially an optimal implementation. The required constraint is that any two neighboring sectors with the same assigned value maintain the same uplink and downlink duration. Consider three towers A, B and C. Let them be deployed linearly wherein cells A and B are neighboring cells with an overlapping region. Similarly let cells B and C be neighboring cells with an overlapping region. Then consider sector 1 in all cells A, B and C. Assume that sector 1 of cell A has 10 handsets in voice session. Similarly, sector 1 of cell B (resp. C) has 5 (resp. 6) handsets in voice session. Let T be the duration of each timeslot including the guard band duration. Then we would have uplink/downlink durations of 10T, 10T and 6T in cells A, B and C respectively. It is quite evident that we need an uplink/downlink duration of 10T in cell A. In cell B, though we have only 5 handsets that are in a voice session, we end up allocating 10 uplink and downlink slots. Of these 10 timeslots 5 timeslots would go unused. Assigning 6 uplink and downlink timeslots in cell C will not result in any interference with cell C.

Since certain changes may be made in the above described MAC protocol that combines contention-free and contention-based MAC protocols for use in VoIP systems with multiple base stations without departing from the scope of the invention herein involved, it is intended that all matter contained in the description thereof or shown in the accompanying figures shall be interpreted as illustrative and not in a limiting sense.

What is claimed is:

1. A medium access control protocol device for interference avoidance in identified interference areas that combines contention-free and contention-based medium access control protocols into a heterogeneous medium access control protocol used for forwarding Internet Protocol packets containing voice traffic, signaling traffic, and application data traffic between multiple base stations and mobile nodes in a voice over internet protocol system on a wireless network having multiple interfering base stations comprising:

two or more base stations in electrical communication with the Internet; said two or more base stations each having 360 degree antennas with each of said antennas divided into two or more sectors wherein each of said two or more sectors are separately identified and with each of the said two or more base stations having similarly facing sectors having those similarly facing sectors being similarly identified;

said two or more base stations having clocks for synchronization;

one or more mobile nodes in wireless electrical communication with said two or more base stations;

said two or more base stations and said one or more mobile nodes each having a medium access control protocol;

said medium access control protocol having hyper-frames each having a time duration equal to a packetization interval dynamically determined by the duration of the voice traffic in said Internet Protocol packets for each of said super-frames such that each of said super-frames is long enough to transmit exactly one voice traffic packet and then said mobile node forwarding said voice traffic packet after each voice traffic packet is generated;

said hyper-frames comprised of two or more super-frames of equal durations of time wherein the number of said super-frames is determined by the number of interfering base stations and wherein each of said two or more super-frames is time coordinated with each of said two or more similarly identified sectors of said interfering base stations;

each of said two or more super-frames made up of an initial time for contention-free timeslot based access voice traffic and a remainder time for contention-based access signaling traffic and application data traffic;

said two or more base stations first dynamically determining a time duration of each of said two or more super-frames and said initial time for contention-free timeslot based access based on the number of said two or more super-frames and the packetization;

said initial time for contention-free timeslot based access then being divided into a control data timeslot, a downlink timeslot, and an uplink timeslot wherein the control data timeslot contains information regarding a current super-frame of said two or more super-frames and said one or more mobile nodes are all capable of receiving said information during said control data timeslot in each of said two or more super-frames;

said contention-based access then containing control messages transmitted between each of said two or more base stations and said one or more mobile nodes when said one or more mobile nodes join or leave the wireless network or initiate a voice session;

said one or more mobile nodes then using carrier sense multiple access with collision avoidance with binary exponential back off contention-based access;

wherein said control messages are then assigned a highest priority, said signaling traffic are assigned a lower priority, and said data application messages are assigned a lowest priority;

wherein said control data timeslot is then used to transmit messages between each of said two or more base stations and to synchronize said clocks such that all of said similarly identified sectors are scheduled to transmit or receive at the same time; and, wherein any two adjacent base stations having similarly identified sectors then using the same uplink timeslot and downlink timeslot time duration.

2. The medium access control protocol device of claim 1 wherein a limit is set on the number of said Internet Protocol packets for each of said one or more mobile nodes such that if the number of said Internet Protocol packets to be sent by one of said two or more base stations to said one or more mobile nodes exceeds the limit the base station will drop one or more of said Internet Protocol packets.

3. The medium access control protocol device of claim 1 wherein said Internet Protocol packets contain a time stamp and are sorted by each of said two or more base stations according to said time stamp and then sent to said one or more mobile nodes in accordance with said time stamp such that said Internet Protocol packet with the earliest time stamp is sent before later time stamped Internet Protocol packets.

\* \* \* \* \*